(12) United States Patent
Gapontsev et al.

(10) Patent No.: US 8,204,349 B2
(45) Date of Patent: Jun. 19, 2012

(54) OPTICAL FIBER WITH MULTIPLE RING-SHAPED CORE REGIONS

(75) Inventors: Valentin P Gapontsev, Worcester, MA (US); Nikolai Platonov, Worcester, MA (US); Roman Yagodkin, Worcester, MA (US); Volodia Sergueev, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 316 days.

(21) Appl. No.: 12/607,500

(22) Filed: Oct. 28, 2009

(65) Prior Publication Data

US 2011/0097049 A1    Apr. 28, 2011

(51) Int. Cl.
 *G02B 6/36* (2006.01)
(52) U.S. Cl. .......................... 385/127; 385/123; 385/126
(58) Field of Classification Search .................. None
 See application file for complete search history.

(56) References Cited

U.S. PATENT DOCUMENTS

| | | | |
|---|---|---|---|
| 5,121,460 A * | 6/1992 | Tumminelli et al. .......... | 385/126 |
| 5,596,671 A * | 1/1997 | Rockwell, III ............... | 385/147 |
| 5,790,735 A * | 8/1998 | Oleskevich et al. .......... | 385/127 |
| 6,288,835 B1 | 9/2001 | Nilsson et al. | |
| 6,327,403 B1 * | 12/2001 | Danziger et al. ............... | 385/29 |
| 6,434,311 B1 * | 8/2002 | Danziger et al. ............. | 385/126 |
| 6,496,301 B1 | 12/2002 | Koplow et al. | |
| 6,959,022 B2 * | 10/2005 | Sandrock et al. ................. | 372/6 |
| 7,257,293 B1 | 8/2007 | Fini | |
| 7,263,267 B2 * | 8/2007 | Guan et al. .................... | 385/141 |
| 7,272,287 B2 | 9/2007 | Bise et al. | |
| 7,424,193 B2 | 9/2008 | Galvanauskas | |
| 7,570,856 B1 * | 8/2009 | Minelly et al. ................ | 385/126 |

* cited by examiner

*Primary Examiner* — Tina Wong
(74) *Attorney, Agent, or Firm* — Yuri Kateshov; Timothy J. King

(57) ABSTRACT

Optical apparatus, comprising an optical fiber having a wavelength of operation, the optical fiber comprising an inner core, the inner core supporting a fundamental mode and at least first and second higher order modes (HOMs) at the wavelength of operation; a first ring-shaped core region spaced from and disposed about the inner core; a second ring-shaped core region spaced from and disposed about the ring-shaped core region; and wherein the optical fiber is configured and arranged such that the first HOM optically interacts with the first ring-shaped core region and the second HOM optically interacts with the second ring-shaped core region.

20 Claims, 8 Drawing Sheets

LP(1) = LP$_{01}$

LP(2) = LP$_{11a}$

LP(3) = LP$_{11b}$

LP(4) = LP(5)$_{21a}$

LP(5) = LP(5)$_{21b}$ $LP(1) = R_{01}$ $LP(2) = R_{11o}$ $LP(3) = R_{11e}$ $LP(4) = R_{21o}$ $LP(5) = R_{21e}$ $LP(6) = R_{31o}$ $LP(7) = R_{31e}$ $LP(8) = R_{41o}$ $LP(9) = R_{41e}$

LP(10) =1R$_{51o}$

LP(11) = 1R$_{51e}$

LP(12)=2R$_{01}$

LP(13) =1R$_{61o}$

LP(14) =1R$_{61e}$

LP(15) =2R$_{11o}$

LP(16) = 2R$_{11e}$

LP(17) =2R$_{21o}$

LP(18) =2R$_{21e}$

LP(1) = LP$_{01}$

LP(2) = 1R$_{01}$

LP(3) = (LP$_{11}$-1R$_{11}$)m1o

LP(4) = (LP$_{11}$-1R$_{11}$)m1e

LP(5) = (LP$_{11}$-1R$_{11}$)m2o

LP(6) = (LP$_{11}$-1R$_{11}$)m2e

LP(7) = 1R$_{21o}$

LP(8) = 1R$_{21e}$

LP(9) = 1R$_{31o}$

LP(10) = 1R$_{31e}$

LP(11) = 1R$_{41o}$

LP(12) = 1R$_{41e}$

LP(13) = 1R$_{51o}$

LP(14) = 1R$_{51e}$

LP(15) = 2R$_{01}$

LP(16) = R$_{61o}$

LP(17) = 1R$_{61e}$

LP(18) = 2R$_{11o}$

LP(19) = (LP$_{21}$ − 2R$_{21}$)m$_{1o}$

LP(20) = 2R$_{11e}$

LP(21) = (LP$_{21}$ − 2R$_{21}$)m$_{1e}$

LP(22) = (LP$_{21}$ − 2R$_{21}$)m$_{2o}$

LP(23) = 2R$_{31o}$

LP(24) = (LP$_{21}$ − 2R$_{21}$)m$_{2e}$

OPTICAL FIBER WITH MULTIPLE RING-SHAPED CORE REGIONS

FIELD OF THE INVENTION

The present invention relates to optical fibers and optical fiber apparatus, such as, for example, optical fiber amplifiers, lasers and amplified spontaneous emission (ASE) sources.

BACKGROUND OF THE DISCLOSURE

Lasers, amplifiers and other optical apparatus based on optical fiber can provide flexible, rugged and relatively simple sources of optical energy. Accordingly, in many applications such optical fiber apparatus can often have one or more advantages as compared to counterparts based on a gas medium (e.g., $CO_2$) or on a bulk solid-state medium (e.g., a Nd:YAG rod). For example, optical fiber lasers can have a smaller footprint, or can be more efficient, or can require less sophisticated cooling arrangements as compared to using a gas or bulk rod solid-state laser in a similar application. Often, however, it can be desirable to increase the output power of optical fiber apparatus, as certain gas and bulk solid-state lasers can readily produce high CW output powers or pulses of optical energy having high energy and/or high peak power.

Unfortunately, because of the high power density inherent in confining optical energy to the relatively small cross sectional area of an optical fiber, non-linear phenomena, such as Stimulated Raman Scattering (SRS) or Stimulated Brillouin Scattering (SBS), can severely limit scaling the output power of a fiber laser or amplifier to higher powers. Though these non-linear processes are complex, each can be addressed, at least in part, by reducing the power density in the core of the fiber. One way to reduce power density is to increase the diameter of the core of the fiber and/or reduce the numerical aperture (NA) of the core, such that the fiber has a larger mode field diameter (MFD). Reducing the power density in this manner can increase the power threshold for the onset of the undesirable non-linear phenomena.

This approach, however, is not without drawbacks. Fibers having larger core diameters can typically support higher order transverse modes (e.g., $LP_{11}$, $LP_{21}$, $LP_{02}$ etc.) in addition to the fundamental mode (e.g., $LP_{01}$). Such higher orders modes (HOMs) tend to degrade the quality of output optical energy provided by the fiber apparatus and hence raise the $M^2$ parameter (lower $M^2$ means better beam quality). In many applications a low $M^2$ is desired. Forestalling the onset of non-linear effects while also maintaining good beam quality can present a challenge to the designer of optical fiber apparatus.

Some approaches to this challenge are known in the art. For example, U.S. Pat. No. 6,496,301, issued on Dec. 17, 2002 to Koplow, Kliner and Goldberg, teaches bending a multimode fiber having a larger core to substantially attenuate, via increased bend loss, higher order modes such that a fiber amplifier provides gain in substantially a single mode. See also U.S. Pat. No. 7,424,193, issued on Sep. 9, 2008 to Alamantas Galvanauskas, which teaches a composite waveguide having a central core and at least one side core helically wound about the central core and in optical proximity to the central core. According to the '193 patent, higher order modes of the central core selectively couple to the helical side core and experience high loss such that the central core is effectively single-mode.

Existing techniques, however, are not necessarily entirely satisfactory in all circumstances. Accordingly, it is an object of the present invention to address one or more of the deficiencies or drawbacks, of the prior art.

SUMMARY OF THE DISCLOSURE

In one aspect of the disclosure an optical apparatus can comprise an optical fiber having a wavelength of operation. The optical fiber can comprise an inner core, a first absorbing ring-shaped core region spaced from and disposed about the inner core, the first absorbing ring-shaped core region being absorbing in that it comprises a first absorbing material for absorbing optical energy having the wavelength of operation, and a second absorbing ring-shaped core region spaced from and disposed about the inner core, the first absorbing ring-shaped core region being absorbing in that it comprises a second absorbing material for absorbing optical energy having the wavelength of operation. The inner core can support at the wavelength of operation a fundamental mode and, if considered in the absence of the first and second absorbing ring-shaped core regions, at least first and second higher order modes (HOMs) of the inner core. The first absorbing ring-shaped core region can be configured and arranged for suppressing the first HOM of the inner core and the second absorbing ring-shaped core region is configured and arranged for suppressing the second HOM of the inner core. The first and second HOMs of the inner core are typically different HOMs of the inner core (though in principle they could be the same).

In another aspect of the disclosure there is provided an optical apparatus comprising an optical fiber having a fundamental mode having an increased effective area such that the optical fiber can propagate higher power before the onset of undesirable non linear effects. The optical fiber can comprise a core structure comprising a central core and a plurality of concentric ring-shaped core regions spaced from each other and from the central core. The optical fiber can also comprise a region of cladding surrounding the central core and disposed between the central core and the nearest of the plurality of ring-shaped core regions. The optical fiber can have a wavelength of operation and the central core have a diameter of at least about 14 microns and the central core, if considered as if surrounded only by the region of cladding, can have at the wavelength of operation a V-number of at least 3 and can support a plurality of higher order modes ("central core HOMs"). In certain practices the V-number can be at least 4, at least 5, or at least 6. The core structure can be configured and arranged such that the central core is effectively single mode at the wavelength of operation and remains so without the need to bend the fiber to substantially increase the bend loss of the central core HOMs. "Surrounded only by the region of cladding" means considered as if the ring-shaped core regions were not present and the region of cladding is simply was expanded to take the place of the ring-shaped core regions.

Each of the plurality of central core HOMs can combine with a mode of a ring-shaped core region to form a HOM of the core structure wherein the value of the overlap integral of the HOM of the core structure with the central core and with a ring-shaped core region are of the same order of magnitude. At least two of the plurality of ring-shaped core regions can have modes that so combine with central core HOMs. The value of the overlap integral of the lowest order mode of the core structure with the central core can be greater by at least an order of magnitude than the value of the overlap integral of the lowest order mode with any of the plurality of ring-shaped core regions.

In yet a further aspect, the disclosure can provide an optical apparatus. The optical apparatus can comprise an optical fiber having a wavelength of operation, with the optical fiber comprising an inner core, the inner core supporting a fundamental mode and at least first and second higher order modes (HOMs) at the wavelength of operation. The optical fiber can comprise a first ring-shaped core region spaced from and disposed about the inner core and a second ring-shaped core region spaced from and disposed about the ring-shaped core region. The optical fiber can be configured and arranged such that the first HOM optically interacts with the first ring-shaped core region and the second HOM optically interacts with the second ring-shaped core region.

In other aspects of the disclosure, the first and second HOMs of the inner core can be of a same or different azimuthal order. The first and second HOMs of the inner core can be of a same or different radial order. For example, the first and second HOMs of the inner core can be of different azimuthal order and of the same or different radial order. As another example, the first and second HOMS of the inner core can be of the same azimuthal order and of a different radial order. The first HOM of the inner core can be of a lower order than the second HOM of the inner core. The first absorbing material can comprise a constituent that is substantially the same as a constituent of the second material. The forgoing discussion regarding the first and second HOM of the core can apply equally as well to central core HOMs as those terms are used herein, where "first" can correspond to one of the central core HOMs and second can correspond to another of the central core HOMs. One of the first and second absorbing materials can comprise a rare earth material, such as, for example, at least one of samarium, praseodymium or terbium. The optical fiber can comprises a double clad fiber including a pump cladding for receiving pump optical energy. The optical fiber can comprise an active material for providing optical energy having the wavelength of operation responsive to the optical fiber receiving pump optical energy, and the active material can comprise a rare earth material, such as rare earth ions. The rare earth material can comprise, for example, one or more of erbium, ytterbium, neodymium or thulium, which can be present as ions. Such rare earth materials could also be used as absorbing materials.

In one practice of the disclosure, the inner core, when considered in the absence of the first and second absorbing ring-shaped core regions, does not support any other HOMs at the wavelength of operation, such that the core is in effectively single mode at the wavelength of operation. In one example of the foregoing, the inner core, when considered in the absence of the first and second absorbing ring-shaped core regions, does not support any other HOMs at a wavelength of about 1060 nanometers, such that the inner core is effectively single mode at a wavelength of about 1060 nanometers. Alternatively or additionally, the inner core, when considered in the absence of the first and second absorbing ring-shaped core regions, does not support any other HOMs at a wavelength of about 1550 nanometers, or of about 2000 nanometers, such that the inner core is effectively single mode at the wavelength at one or both of the wavelengths of about 1550 or 2000 nanometers. The inner core can comprise an outer perimeter and not comprise an inner perimeter.

In yet additional aspects of the disclosure, the inner core, which can comprise a central core, can comprise a diameter of at least 20 microns or a diameter of at least 30 microns. The central or inner core can comprise a numerical aperture when considered in relation to the region of cladding. In one practice of the teachings herein the numerical aperture is no greater than 0.10, or alternatively, no less than 0.13 or no less than 0.15. Absorbing material for absorbing optical energy having the wavelength of operation, if absorptive of optical energy having the pump wavelength, can have a higher absorption for optical energy having the wavelength of operation than for optical energy having the pump wavelength. The propagation loss of a suppressed mode can be at least 5 times, in terms of dB per unit distance, higher than the propagation loss of the fundamental mode at the wavelength of operation. A ring-shape core region can comprise a ring core.

In even more aspects of the disclosure, an optical apparatus comprising an optical fiber can be configured as a laser. The laser can comprise a source of pump optical energy, which can include one or more pump diodes. The laser can include a laser cavity defined by at least one optical fiber Bragg grating. The optical fiber apparatus can be configured as a master oscillator-power amplifier (MOPA) arrangement, wherein a seed oscillator feeds a power amplifier, which can comprises an optical fiber amplifier. The master oscillator need not comprise a fiber-based device, and can, for example, comprise a laser diode, and in this case the optical fiber apparatus may not, in some cases, include a laser cavity defined by at least one optical fiber Bragg Grating. The optical fiber apparatus can be constructed and adapted such the optical fiber is "end-pumped" or "side-pumped." Also, the optical apparatus can include a second fiber disposed alongside the optical fiber, as is described in more detail elsewhere herein, for providing pumping optical energy to the optical fiber.

According to yet a further aspect of the disclosure there is also taught a method of designing and/or fabricating an optical fiber that is effectively single mode despite having an inner core having a numerical aperture and/or a core diameter that when considered relative to the cladding would allow the core to propagate higher order modes at the wavelength of operation of the fiber. In one practice of the method, the fiber can be effectively single mode without incorporating a helical side core into the fiber (very difficult to do) and without, perhaps, having to rely as much on bending the fiber to increase the attenuation of higher order modes relative to the fundamental mode. The method can comprise the steps of selecting a desired core size and/or numerical aperture; determining the number and nature of the modes supported by the core at the intended wavelength of operation of the optical fiber; designing a first ring shaped core region to be disposed about the core for suppressing one the higher order modes supported by the core; designing a second ring shaped core region to be disposed about the first ring shaped core region to suppress another of the higher order modes supported by the core at the wavelength of operation. Additional ring shaped core regions can be further designed as necessary to suppress other higher order modes. Designing the ring core region can include selecting the parameters of the ring shaped core region so as to support a mode having the same azimuthal order as the core mode to be suppressed and so as to have an effective refractive index that is substantially the same as that of the core mode to be suppressed. "Substantially the same" in this context means close enough so that the selected modes will interact and combine such adding an absorbing material to the ring shaped core region will sufficiently suppress the higher order mode. One criterion can be such that the overlap integral of the normalized mode profile with the core and with the ring shaped core region are of the same order of magnitude.

"Lower mode order" means that the mode having the lower mode order is nearer in terms of effective index to the fundamental mode than the mode described as having the higher mode order. Generally speaking, as mode order increases the effective refractive index of the mode decreases, such that higher order modes have lower effective refractive indices than lower order modes. "Primarily a mode of the core" or "primarily a core mode" means that properties of the mode (e.g., the fundamental mode) are substantially determined by the inner core properties and the properties of the cladding. A value being of the same order of magnitude as another value means that the ratio of the values is from about 0.1 to about 10; one of the values being at least an order of magnitude greater means that the ration is not within the foregoing range.

"Substantially higher propagation loss," as that term is used herein, means that the loss, as measured in dB per unit distance (e.g., per meter) is at least five (5) times higher at the wavelength of operation (e.g., at least 1.0 dB/meter if the baseline for comparison is 0.2 dB/meter). Such propagation loss can be determined on the basis of a test fiber that does not include a rare earth material, as such material may also absorb optical energy at the operating wavelength and may make comparisons difficult (e.g., the problem of measuring a relatively small difference between relatively large numbers). Stating that one mode is suppressed relative to another mode means that it has substantially higher propagation loss than the other mode. It is noted that the terms "index of refraction" and "refractive index" are at times used interchangeably herein. "Multimode" means not single mode, and includes what is sometimes referred to in the art as "few-molded." Typically a multimode fiber has a V-number of greater than 2.405 at its operating wavelength. Azimuthal order of a mode refers to the value of the first subscript in the mode designation.

Further advantages, novel features, and objects of the invention will become apparent from the following detailed description of non-limiting embodiments of the invention when considered in conjunction with the accompanying FIGURES, which are schematic and which are not necessarily drawn to scale. For purposes of clarity, not every component is labeled in every one of the following FIGURES, nor is every component of each embodiment of the invention shown where illustration is not considered necessary to allow those of ordinary skill in the art to understand the invention.

SPECIFIC DESCRIPTION

Figure 1:
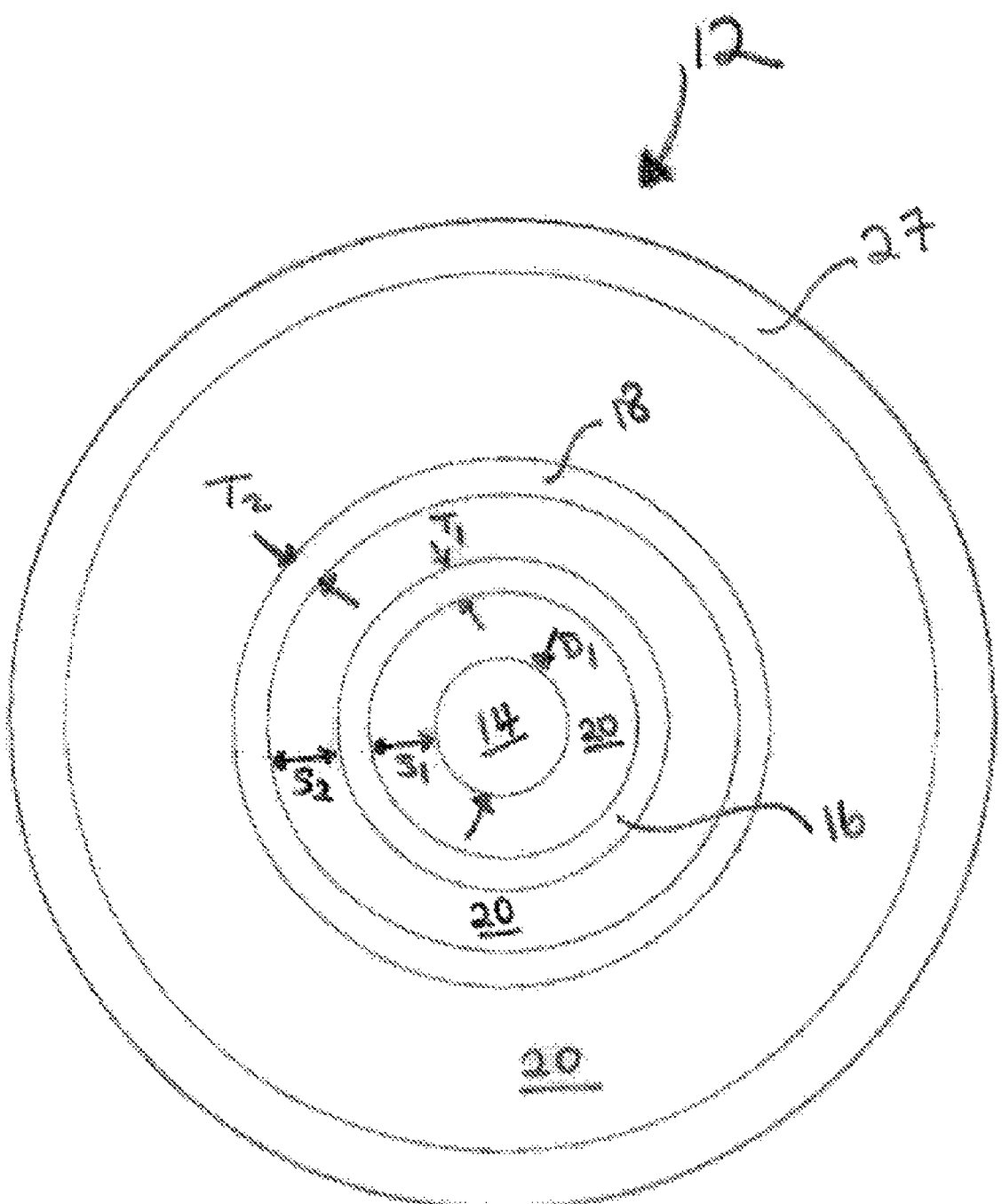
FIG. 1 schematically illustrates a cross section of one embodiment of an optical fiber according to the disclosure, where the cross section is taken perpendicular to the longitudinal axis along which the fiber extends.

FIG. 1 schematically illustrates a cross section of an optical fiber 12, taken perpendicular to the longitudinal axis along which the fiber 12 extends. The optical fiber 12 of FIG. 1 can include an inner core 14 as well as first and second ring-shaped core regions, 16 and 18, respectively. The optical fiber 12 can include a cladding 20, at least a part of which can surround the core 14. As shown in FIG. 1, the cladding 20 can also be disposed about the first and second ring-shaped core regions 16 and 18.

Figure 2:
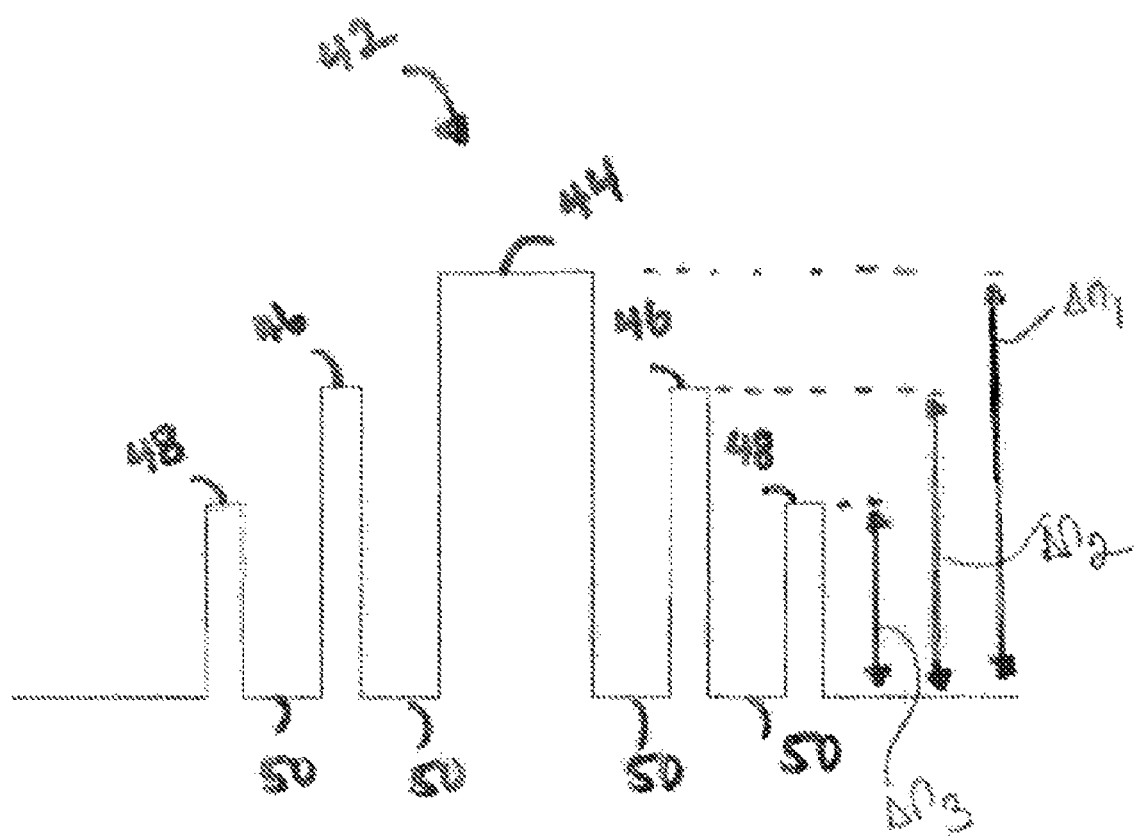
FIG. 2 schematically illustrates a plot of a possible refractive index profile for the of the optical fiber of FIG. 1.

FIG. 2 schematically illustrates a plot of a possible refractive index profile 42 for the optical fiber of FIG. 1. The refractive index profile 42 can include an inner section 44, corresponding to the inner core 14, sections 46 corresponding to the first ring-shaped core region 16 and sections 48 corresponding to the second ring-shaped core region 18. Regions 50 of the refractive index profile 42 can correspond to the cladding 20.

In the embodiment of the disclosure shown in FIG. 1, the inner core 14 comprises a diameter $D_1$ of about 14 microns, the first ring-shaped core region 16 comprises an inner radius of about 14 microns and an outer radius of about 20 microns, and the second ring-shaped core region 18 comprises an inner radius of about 22 microns and outer radius of about 26 microns. Thus the first ring-shaped core region 16 is spaced from the inner core 14 by a spacing $S_1$ of about 7 microns and has a thickness $T_1$ of about 6 microns, and the second ring-shaped core region 18 is spaced from first ring-shaped core region 16 by a distance $S_2$ of about 2 microns and has a thickness $T_2$ of about 4 microns. The inner core 14 can comprise a refractive index difference $\Delta n_1$ with the cladding 20 of about 0.003, the first ring-shaped core region 16 can comprise a refractive index difference $\Delta n_2$ with the cladding 20 of about 0.00215, and the second ring-shaped core region 18 can comprise a refractive index difference $\Delta n_3$ with the cladding of about 0.001. The core 14, when considered in the absence of the first and second core region (as if they are replaced by cladding 50) has a V-number of about 3.87 at a wavelength of 1060 nanometers and a numerical aperture relative to the cladding 20 of about 0.093.

As noted above, each of the inner core and first and second core regions can typically be characterized by one or more diameters, thickness, indices of refraction and spacing from other regions of the fiber. One or more of foregoing can be varied to provide for a selected optical interaction between a selected mode or modes of the inner core and a ring-shaped core region or to provide for modes of the inner core and a ring-shaped core region as considered together that have selected characteristics to provide for an optical fiber 12 having certain characteristics. For a description of useful techniques, see, for example, U.S. patent application Ser. No. 12/580,358 entitled "Optical Fiber Apparatus with Suppression of Higher Order Modes," filed on Oct. 16, 2009 and U.S.

patent application Ser. No. 12/580,223, entitled "Double Clad Optical Fiber Having Ring Core Surrounding Core for Higher Power Operation," and filed on Oct. 15, 2009, both of which are herein incorporated by reference. The foregoing applications as well as the present application include N. Platonov as an inventor and all are assigned or assignable to a common assignee.

To further facilitate understanding of the disclosure; some detail regarding modeling and analysis of the optical fiber 12 is now provided. The optical fiber 14 can be first analyzed as if the ring shape core regions are absent, that is, replaced by the cladding material. This is referred to herein as an "individual core" analysis and the modes as "core modes" or "inner core modes." However, although the ring-shaped core regions are not present, the overlap integral between the normalized mode intensity and the portion of the fiber the ring-shaped core region would occupy if present can be calculated. Overlap integrals are calculated between the normalized intensity profile of a mode and the region of interest (e.g., inner core or ring-shaped core region). Intensities are normalized for each mode by setting the integral over $r \cdot dr \cdot d\phi$ to 1.) See Table I below.

TABLE I

Waveguide modes in fiber with core diameter of 14.0 μm & Δn = 0.003. nclad = 1.44968 at 1060 nm. NA = 0.093. V = 3.87.

| LP mode | Mode Type | Mode Effective refractive index | Mode overlap integral with core | Mode overlap integral with ring |
|---|---|---|---|---|
| 1 | LP01 | 1.45198 | 0.94157 | 0.00007 |
| 2 | LP11o | 1.45096 | — | — |
| 3 | LP11e | 1.45096 | 0.83074 | 0.00098 |
| 4 | LP21o | 1.44978 | 0.58417 | 0.03368 |
| 5 | LP21e | 1.44977 | — | — |

Figure 3:
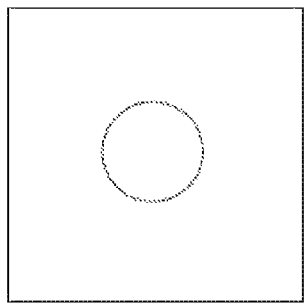
FIG. 3 shows modeled intensity distribution maps for the fundamental and higher order waveguide modes of the inner core of the optical fiber of FIG. 1, with the proviso that the analysis is performed as if the ring-shaped core regions are absent.
Figure 3:
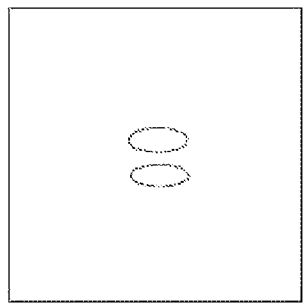
Figure 3:
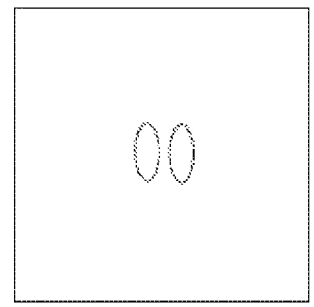
Figure 3:
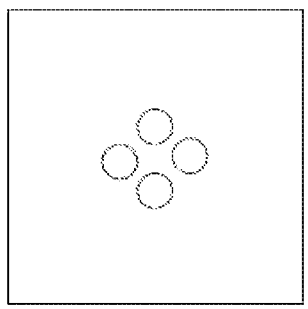
Figure 3:
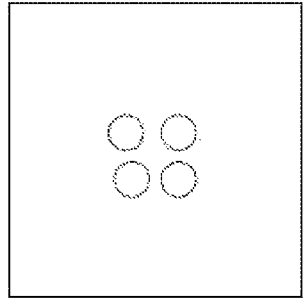

Modes are ordered by their effective index value, with higher order modes having lower effective indices. Modes having an effective index greater than that of the cladding are considered guided. Odd and even degenerate modes are indicated by "o" and "e" subscripts, respectively. Only one calculation is made where values are expected to be the same for the odd and even modes. FIG. 3 shows two dimensional intensity distribution maps for the modes of Table II. The inner core 14 of the optical fiber 12 can support 5 modes at an operating wavelength of 1060 nanometers, namely $LP_{01}$, $LP_{11}$ and $LP_{21}$, where $LP_{11}$ and $LP_{21}$ each have odd and even degeneracy's (designated by "o" and "e", respectively).

The optical fiber can also be analyzed as if one or both of the ring-shaped core regions are present and the inner core 14 is absent. Three analyses are possible—first ring-shaped core region 16 alone, second ring-shaped core region 18 alone, or both ring-shaped core regions 16 and 18 present. Table II presents the results of such an analysis where both of the ring-shaped core regions 16 and 18 are present for the analysis and the inner core 14 is considered as absent and replaced by cladding. This analysis is referred to herein as "individual ring-shaped core regions" analysis and the modes as "ring-shaped core region" or "ring" modes. The other two analyses can be done on an "as needed" basis.

TABLE II

Waveguide modes in fiber with 2 rings $r_1/r_2$ = 14.0/20.0 μm & Δn = 0.00215 and $r_3/r_4$ = 22.0/26.0 μm & Δn = 0.001. $n_{clad}$ = 1.44968 at 1060 nm.

| LP mode | Mode type | Mode effective refractive index | Mode overlap integral mode with core | Mode overlap integral with 1st ring | Mode overlap integral hm with 2nd ring |
|---|---|---|---|---|---|
| 1 | $1R_{01}$ | 1.45103 | 0.00054 | 0.77758 | 0.04416 |
| 2 | $1R_{11o}$ | 1.45099 | | | |
| 3 | $1R_{11e}$ | 1.45099 | 0.00037 | 0.78025 | 0.04199 |
| 4 | $1R_{21o}$ | 1.45089 | | | |
| 5 | $1R_{21e}$ | 1.45089 | 0.00017 | 0.77844 | 0.04687 |
| 6 | $1R_{31o}$ | 1.45072 | 0.00007 | 0.77199 | 0.05539 |
| 7 | $1R_{31e}$ | 1.45072 | | | |
| 8 | $1R_{41o}$ | 1.45049 | | | |
| 9 | $1R_{41e}$ | 1.45049 | | | |
| 10 | $1R_{51o}$ | 1.45020 | | | |
| 11 | $1R_{51e}$ | 1.45020 | | | |
| 12 | $2R_{01}$ | 1.44989 | 0.03211 | 0.11654 | 0.42089 |
| 13 | $1R_{61o}$ | 1.44987 | — | — | |
| 14 | $1R_{61e}$ | 1.44987 | 0.00003 | 0.71150 | 0.10348 |
| 15 | $2R_{11o}$ | 1.44983 | 0.00620 | 0.11769 | 0.46188 |
| 16 | $2R_{11e}$ | 1.44983 | | | |
| 17 | $2R_{21o}$ | 1.44978 | 0.00447 | 0.10224 | 0.48731 |
| 18 | $2R_{21e}$ | 1.44977 | | | |
| 19 | $2R_{31o}$ | 1.44968 | 0.00141 | 0.13307 | 0.47633 |

Figure 4A:
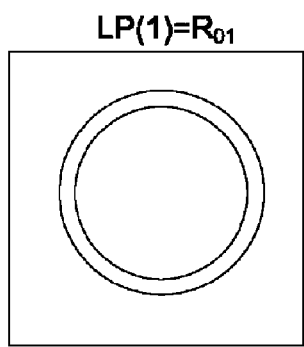
FIG. 4A shows modeled intensity distribution maps for the first nine (9) of the fundamental and higher order waveguide modes of the first and second ring-shaped core regions of the optical fiber of FIG. 1, with the proviso that the analysis is performed as if the inner core is absent.
Figure 4A:
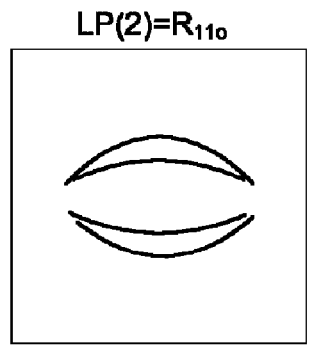
Figure 4A:
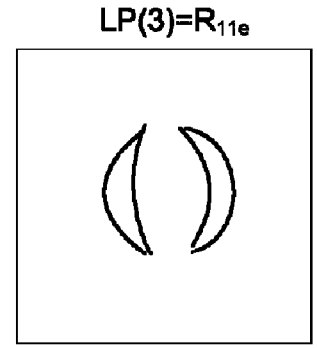
Figure 4A:
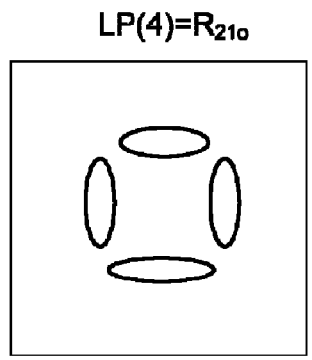
Figure 4A:
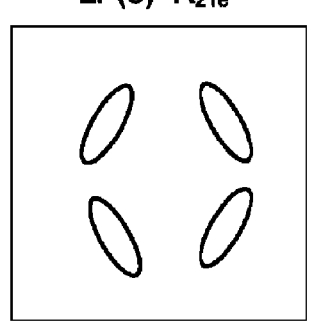
Figure 4A:
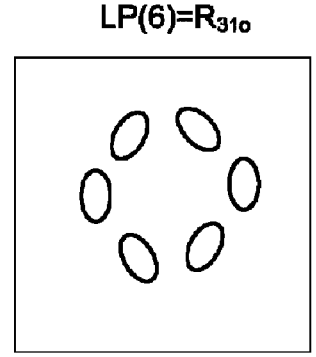
Figure 4A:
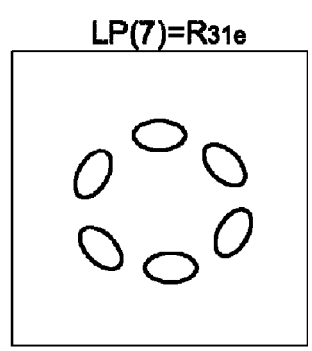
Figure 4A:
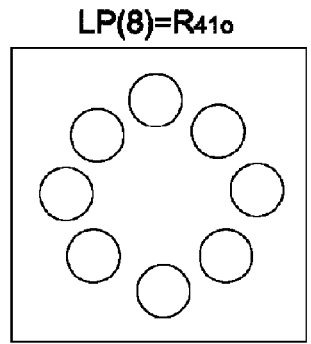
Figure 4A:
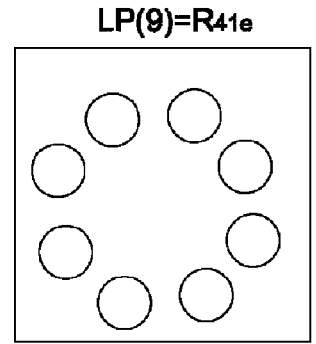
Figure 4B:
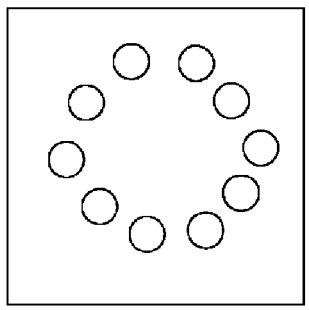
FIG. 4B shows modeled intensity distribution maps for the second nine (9) of the fundamental and higher order waveguide modes of the first and second ring-shaped core regions of the optical fiber of FIG. 1, with the proviso that the analysis is performed as if the inner core is absent.
Figure 4B:
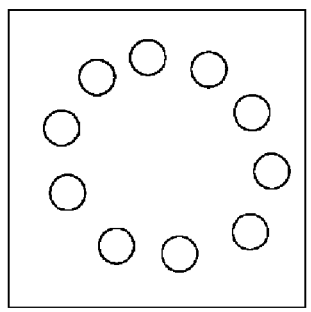
Figure 4B:
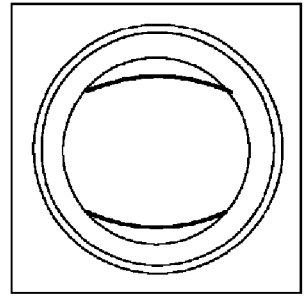
Figure 4B:
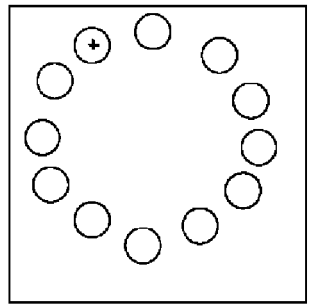
Figure 4B:
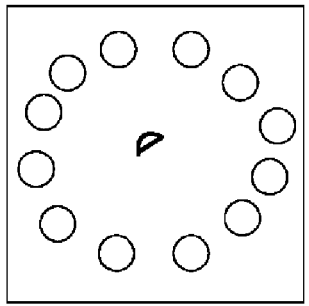
Figure 4B:
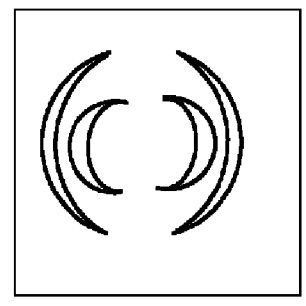
Figure 4B:
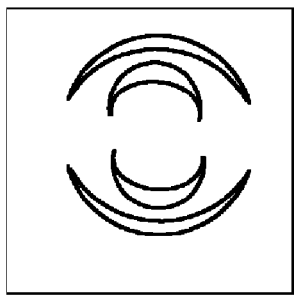
Figure 4B:
Figure 4B:
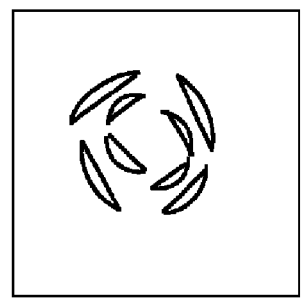

FIG. 4A shows intensity distribution maps for the first nine (9) modes of Table III and FIG. 4B shows intensity distribution maps for the second nine (9) modes, that is, modes LP(10) to LP(18).

Table III below tabulates modeling analysis of the actual optical fiber, that is, where the inner core and the ring-shaped core region are both present.

TABLE III

Waveguide modes in fiber with core diameter of 14.0 μm & Δn = 0.003 and 2 rings $r_1/r_2$ = 14.0/20.0 μm & Δn = 0.00215 and $r_3/r_4$ = 22.0/26.0 μm & Δn = 0.001. $n_{clad}$ = 1.44968 at 1060 nm

| LP mode | Mode type | Mode effective refractive index | Mode overlap integral mode with core | Mode overlap integral with 1st ring | Mode overlap integral with 2nd ring |
|---|---|---|---|---|---|
| 1 | $LP_{01}$ | 1.45198 | 0.94076 | 0.00039 | 0.00000 |
| 2 | $1R_{01}$ | 1.45103 | 0.00240 | 0.78003 | 0.04058 |
| 3 | $(LP_{11}\text{-}1R_{11})_{m1o}$ | 1.45103 | | | |
| 4 | $(LP_{11}\text{-}1R_{11})_{m1e}$ | 1.45102 | 0.21357 | 0.55849 | 0.02774 |
| 5 | $(LP_{11}\text{-}1R_{11})_{m2o}$ | 1.45092 | | | |
| 6 | $(LP_{11}\text{-}R_{11})_{m2e}$ | 1.45092 | 0.64206 | 0.20205 | 0.01409 |
| 7 | $1R_{21o}$ | 1.45089 | | | |
| 8 | $1R_{21e}$ | 1.45089 | 0.00126 | 0.77589 | 0.04652 |
| 9 | $1R_{31o}$ | 1.45072 | 0.00007 | 0.77210 | 0.05543 |
| 10 | $1R_{31e}$ | 1.45072 | | | |
| 11 | $1R_{41o}$ | 1.45049 | | | |
| 12 | $1R_{41e}$ | 1.45049 | | | |
| 13 | $1R_{51o}$ | 1.45020 | | | |
| 14 | $1R_{51e}$ | 1.45020 | | | |
| 15 | $2R_{01}$ | 1.44989 | 0.10012 | 0.09525 | 0.43292 |
| 16 | $1R_{61o}$ | 1.44987 | | | |
| 17 | $1R_{61e}$ | 1.44987 | 0.00415 | 0.73508 | 0.07740 |
| 18 | $2R_{11o}$ | 1.44983 | 0.01076 | 0.12055 | 0.47919 |
| 19 | $(LP_{21}\text{-}2R_{21})_{m1o}$ | 1.44982 | 0.18965 | 0.07086 | 0.31290 |
| 20 | $2R_{11e}$ | 1.44982 | | | |
| 21 | $(LP_{21}\text{-}2R_{21})_{m1e}$ | 1.44981 | | | |
| 22 | $(LP_{21}\text{-}2R_{21})_{m2o}$ | 1.44968 | 0.50460 | 0.04454 | 0.16192 |
| 23 | $2R_{31o}$ | 1.44965 | 0.00061 | 0.13371 | 0.48033 |
| 24 | $(LP_{21}\text{-}2R_{21})_{m2e}$ | 1.44964 | | | |

Figure 5A:
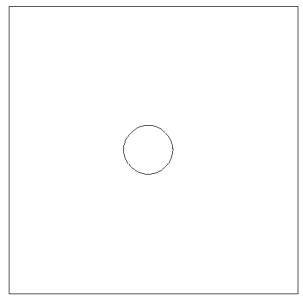
FIG. 5A shows modeled intensity distribution maps for first nine (9) of the fundamental and higher order waveguide modes of the optical fiber of FIG. 1, where the analysis includes the presence of the inner core and first and second ring-shaped core regions.
Figure 5A:
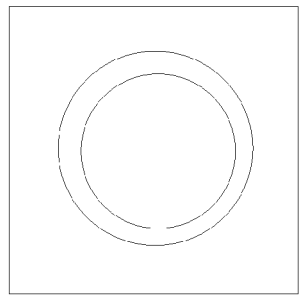
Figure 5A:
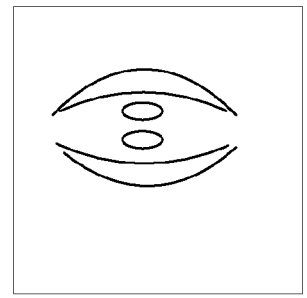
Figure 5A:
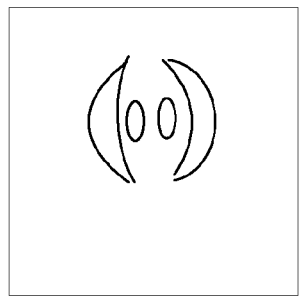
Figure 5A:
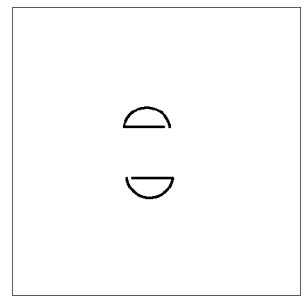
Figure 5A:
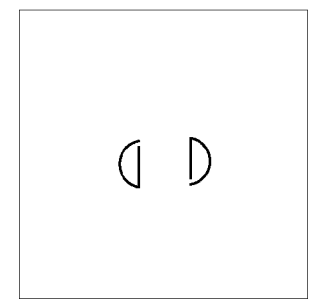
Figure 5A:
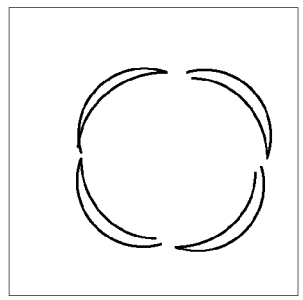
Figure 5A:
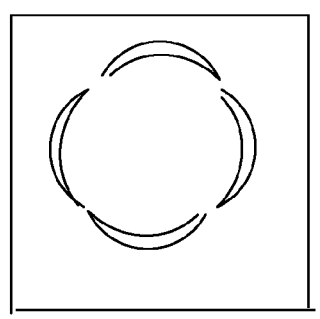
Figure 5A:
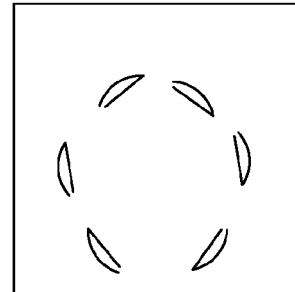
Figure 5B:
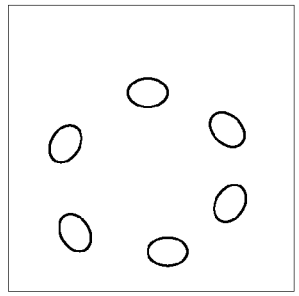
FIG. 5B shows modeled intensity distribution maps for second nine (9) waveguide modes of the optical fiber of FIG. 1, where the analysis includes the presence of the inner core as well as of first and second ring-shaped core regions.
Figure 5B:
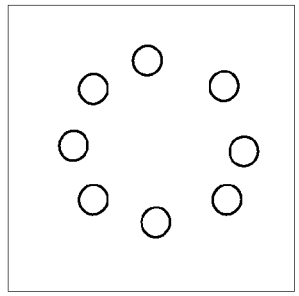
Figure 5B:
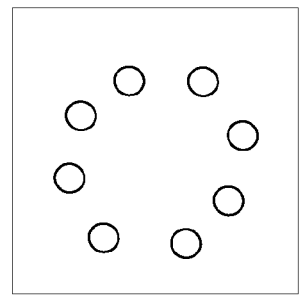
Figure 5B:
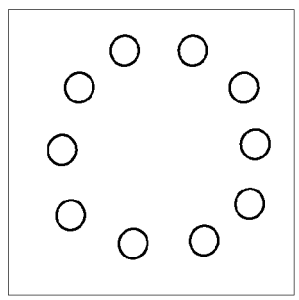
Figure 5B:
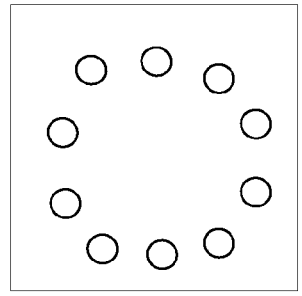
Figure 5B:
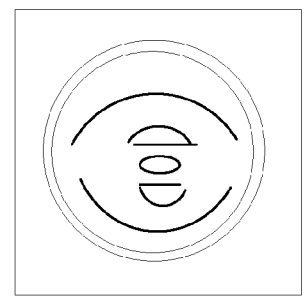
Figure 5B:
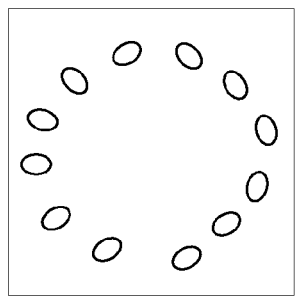
Figure 5B:
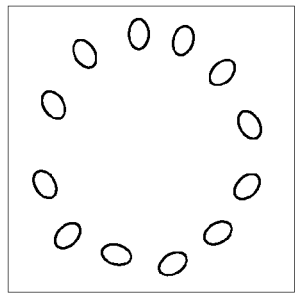
Figure 5B:
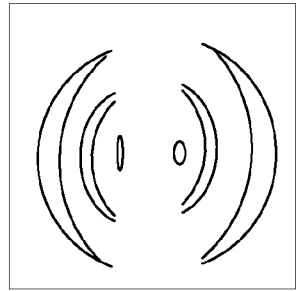
Figure 5C:
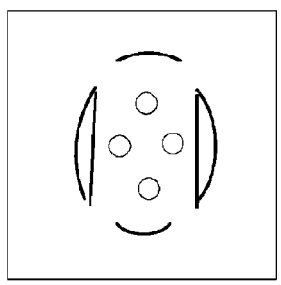
FIG. 5C shows modeled intensity distribution maps at a wavelength of 1060 nanometers for the waveguide modes LP(19)-LP(22) of the optical fiber of FIG. 1, where the analysis includes the presence of the inner core as well as of first and second ring-shaped core regions
Figure 5C:
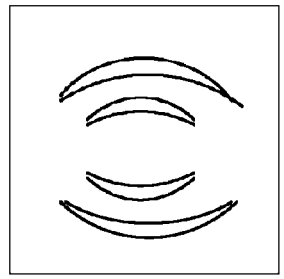
Figure 5C:
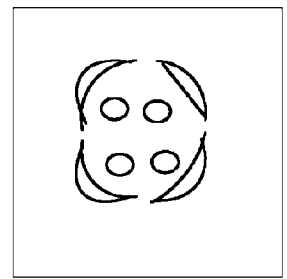
Figure 5C:
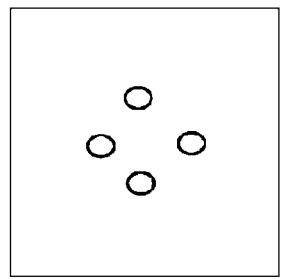
Figure 5C:
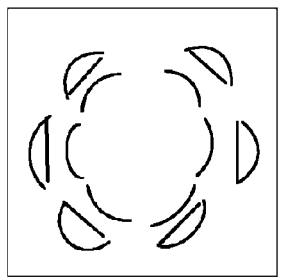
Figure 5C:
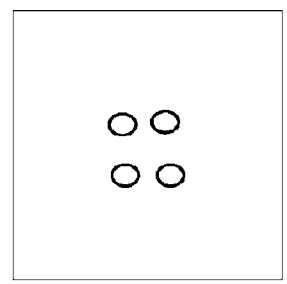

FIG. 5A shows the modeled intensity distribution maps for first nine (9) of the modes of Table III. FIG. 5B shows the modeled intensity distribution maps for second nine (9) waveguide modes (mode LP(10) to mode LP(18)) of Table III, and FIG. 5C shows the intensity distribution maps for the remaining modes (mode LP (19) to mode LP (24)). This analysis is referred to as an "actual fiber" analysis, and the modes as "actual fiber modes" or "actual modes." To better demonstrate the modal intensity distribution maps, the analysis used to generate the maps of FIGS. 3-5 does not include the effect of any absorbing material comprise by the ring-shape core regions.

With reference to Tables I and II, note that the effective refractive index of the $LP_{11}$ odd and even inner core modes (1.45096) is substantially the same as that of the effective refractive index of the $1R_{11}$ odd and even modes of the first ring-shaped core region (1.45099). (The difference, $3\times10^{-5}$, is certainly considered narrower than the full ambit of "substantially the same.") Furthermore, both the modes are of the same (one in this case) azimuthal order. Thus it is expected that the modes are good candidates for optically interacting. However, the $1R_{21}$ mode of the first ring-shaped core region, while having the same azimuthal order as the $LP_{21}$ mode of the inner core, has a effective refractive index (1.45089) that differs from that of the $LP_{21}$ inner core mode (1.44978) by a larger amount, namely about $1\times10^{-3}$, than the above noted difference between the $1R_{11}$ mode and the $LP_{11}$ inner core mode. Such a larger difference could interfere with good optical interaction.

However, applicants have determined that the properties of the second ring-shaped core region can be selected to provide a mode that can interact with the $LP_{21}$ inner core mode and furthermore that the presence of such a second ring-shaped core region does not prevent the desired optical interaction between a mode of the first ring-shaped core region and a selected core mode (e.g., the interaction between the $1R_{11}$ mode and the $LP_{11}$ mode). With reference to Tables I and II, note that, for example, the $LP_{21o}$ and $LP_{21e}$ inner core modes have the same effective refractive indices as, respectively, the $2R_{21o}$ and $R_{21e}$ modes of the second ring-shaped core region 18 of the optical fiber 12. Thus these modes are good candidates for optical interaction, as they also have the same azimuthal mode number.

Table III and FIGS. 5A-5C, which represent the modeling of the actual fiber, confirm that the aforementioned modes do interact. Consider the $LP_{11}$ and $1R_{11}$ modes. While certain individual modes shown in the individual intensity distribution maps of FIG. 3 (e.g., $LP_{01}$) and FIG. 4A (e.g., $1R_{01}$) appear with largely he same intensity distribution in the actual fiber intensity distribution maps of FIG. 5 (see, in the case of $LP_{01}$ and $1R_{01}$, LP(1) and LP (2) of the FIG. 5A), analogs to the inner core modes $LP_{11}$ and the first ring-shaped core region modes $1R_{11}$ are not easily found in FIG. 5A, 5B or 5C. Modes LP (3)-LP (6) in FIG. 5A, however, appear to he logical combinations of the $LP_{11}$ and $1R_{11}$ modes shown in FIGS. 3 and 4A (modes LP(2) and LP(3) in FIG. 3 and modes LP(2) and LP(3) of FIG. 4A).

The actual fiber analysis modeling of Table III further confirms optical interaction. Each of LP(3) to LP(6) has an overlap integral wherein the value for the overlap with the first ring-shaped core region is of the same order of magnitude as the value for the overlap with the inner core. In contrast, the overlap for LP(1), corresponding to $LP_{01}$ of the inner core, with the core is 3 orders of magnitude larger that the value of the overlap with the first ring-shaped core region. The modes LP(3), LP(4), LP(5) and LP(6) in Table III and FIG. 5A are labeled, respectively, $(LP_{11}-1R_{11})_{m1o}$, $(LP_{11}-1R_{11})_{m1e}$, $(LP_{11}-1R_{11})_{m2o}$ and $(LP_{11}-R_{11})_{m2e}$ to reflect how the actual modes are understood to develop (two individual odd modes result in two odd actual fiber modes and two individual even modes result in two even actual fiber modes, for a resulting total of four modes.

A similar analysis of the data and intensity distribution maps confirms interaction between $LP_{21}$ of the inner core 14 and $2R_{21}$ of the second ring-shape core region 18 of FIG. 1. See modes LP(19), LP(21), LP(22) and LP (24) of Table III and FIG. 5Cm $LP_{21}$ of Table I and FIG. 3, and $2R_{21}$ of Table II and FIG. 4B. It is also noted that mode LP(25) and L(24) of Table III have effective refractive indices that are very close to or even less than that of the cladding, and hence are considered to be "leaky." A leaky mode, such as the $(LP_{21}-2R_{21})_{m2e}$ (listed as LP(24) in table III) can help suppress higher order modes via attenuation by leaking optical energy into the cladding.

Thus Applicant has determined that it is indeed practical and workable to have one ring-shaped core region provide for optical interaction with one of the inner core modes and, simultaneously, another ring-shaped core region may provide a mode having a desired azimuthal order and effective refractive index for interacting optically with a different one of the inner core modes. Modes that optically interact can provide a means for suppressing one or both of the interacting modes at a selected wavelength by adding a material that absorbs optical energy at the wavelength to, for example, the ring-shaped core regions. Codes modes that do not strongly optically interact with a mode of the first and second ring-shaped core regions can avoid being suppressed. Thus by suppressing the $LP_{11}$ and $LP_{21}$ core modes via the first and second ring-shaped core regions each including absorbing material, the optical fiber 12 can be effectively single mode at a selected wavelength or over a selected wavelength range.

With reference to the overlap integrals of the $LP_{01}$ inner core modes listed in Tables I and III, the $LP_{01}$ inner core mode has little interaction with modes of the ring-shaped core regions and hence absorbing material comprised by the ring-shaped core regions 16 and 18 suppresses the $LP_{11}$ and $LP_{21}$ modes with far less impact, if any, on the $LP_{01}$ inner core mode.

With reference again to FIG. 1, the core 14 of the optical fiber 12 can comprise an active material for providing optical energy (e.g., via the process of stimulated emission) responsive to the optical fiber 12 receiving pump optical energy having a pump wavelength. The active material can comprise a rare earth material, such as, for example, one or more of erbium, ytterbium, neodymium or thulium (e.g., a concentration of Er, Yb, Nd or Th ions).

If the optical fiber 12 comprises a rare earth material that is to be pumped, it can be desirable to select an absorbing material that tends not to absorb the pump optical energy. Absorbing materials useful with typical rare earths include samarium, praseodymium or terbium. $Sm^{3+}$ and $Pr^{3+}$ ions, which have strong absorption around 1064 nm and 1030 nm, respectively, can be useful when the optical fiber apparatus include a rare earth material, such as ytterbium, providing light at around 1060 mu. Ytterbium can be pumped, for example, at 915, 940 or 975 nm, and, as one example, samarium and praseodymium have low absorption at 975 nm. Samarium can also be particularly useful when the rare earth material comprises neodymium or ytterbium and erbium. Terbium can be particularly useful when, for example, pumping the rare earth material thulium at 1576 nm and samarium when pumping at 790 nm. Thulium can provide optical energy at about 2000 nm, as is known in the art. The absorbing material can have concentration of, for example, about 500 ppm, about 1000 ppm, about 1500 ppm about 2000 ppm or greater than about 2000 ppm.

One of both of ring-shaped core regions 14 and 16 can comprise a silica-based glass. The silica-based glass can comprise, for example, one or more of a concentration of aluminum, phosphorus, germanium or fluorine. In one example, the ring-shaped core region comprises a concentration of phosphorus and fluorine, such as in a silica based glass; in another example, the ring-shaped core region can comprise a concentration of aluminum and can include, for example, a concentration of germanium. In one example, a silica based glass can comprise the aluminum and germanium concentrations, and the absorbing material can comprise samarium. The concentration ranges specified above for the absorbing material can be useful for the Al, Ge, P and F materials noted above.

It is expected that the attenuation of a suppressed mode can be at least between one and two orders of magnitude greater that than of the fundamental mode, where the attenuation is specified in terms of dB/meter (e.g., tenths of a dB/meter for $LP_{01}$ compared to tens of dB/meter for the mixed mode to which the $LP_{02}$ mode is converted). See Table I below.

The optical fiber 12 can optionally include at least one additional region 27 disposed about the cladding 20. The region 27 shown in FIG. 1 can represent a second cladding disposed about the cladding 20 for tending to confine optical energy, such as pump optical energy, to the cladding 20 for guidance thereby. Such a fiber is referred to in the art as a "cladding pumped" or "double-clad" optical fiber, and the cladding 20 in such a fiber can be referred to as a "pump cladding." The second cladding can comprise, for example, a glass or a fluorinated low index polymer coating applied and cured during draw of the optical fiber 12. Alternatively, the region 27 can represent a high index polymer protective region, typically comprising an outer higher modulus layer disposed over an inner lower modulus layer. One or both of the layers can be applied as coatings to the optical fiber as part of the draw process. Variations of the foregoing are of course possible. For example, the region 27 can comprise a glass second cladding for tending to confine pump light to the cladding 20, and the region 27 can in turn have disposed thereabout a polymer protective region having one or more layers.

It is also noted that the cladding 20 can comprise glass, such as, for example, a silica-based glass. It is often desirable that the cladding 20 consist of or consist essentially of glass, such as a silica based glass or pure silica glass, to help ensure that the optical fiber 20 can handle high power levels of light having the pump wavelength, especially when the optical fiber 20 comprises a cladding pumped fiber. The cladding 20 can, in certain aspects of the disclosure, be substantially homogenous. The cladding 20 can be free of a "micros structure," which typically includes longitudinally extending features, such as voids, for proving for the guidance of optical energy by the optical fiber. In certain practices of the teachings herein, an optical fiber according to the disclosure can be of a conventional type, meaning it is not a microstructured or photonic crystal fiber.

Several embodiments of the invention have been described and illustrated herein. Those of ordinary skill in the art will readily envision a variety of other means and structures for performing the functions and/or obtain the results or advantages described herein and, each of such variations or modifications is deemed to be within the scope of the present invention. For example, although an embodiment described herein includes two ring-shaped core regions and an inner core (which can comprise a central core), the disclosure is not limited to optical fiber having just two ring-shaped core regions, and an optical fiber having more than two ring-shaped core regions is considered within the scope of invention. More generally, those skilled in the art would readily appreciate that all parameters, dimensions, materials and configurations described herein are meant to be exemplary and that actual parameters, dimensions, materials and configurations will depend on specific applications for which the teaching of the present disclosure is used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

In the claims as well as in the specification above all transitional phrases such as "comprising," "including," "carrying," "having," "containing," "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time).

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red.

What is claimed is:

1. Optical apparatus, comprising:
    an optical fiber having a wavelength of operation, said optical fiber comprising
    an inner core;
    a first absorbing ring-shaped core region spaced from and disposed about said inner core, said first absorbing ring-shaped core region being absorbing in that it comprises a first material for absorbing optical energy having the wavelength of operation;
    a second absorbing ring-shaped core region spaced from and disposed about said inner core, said second absorbing ring-shaped core region being absorbing in that it comprises a second material for absorbing optical energy having the wavelength of operation;

said inner core supporting at said wavelength of operation a fundamental mode and, when considered in the absence of said first and second absorbing ring-shaped core regions, at least first and second higher order modes (HOMs) of said inner core; and wherein said first absorbing ring-shaped core region is configured and arranged for suppressing said first HOM of said inner core and said second absorbing ring-shaped core region is configured and arranged for suppressing said second HOM of said inner core.

2. The optical fiber apparatus of claim 1 wherein said first and second HOMs of said inner core are of a different azimuthal order.

3. The optical fiber apparatus of claim 2 wherein said first and second HOMs of said inner core are of a different radial order.

4. The optical fiber apparatus of claim 2 wherein said first and second HOMs of said inner core are of the same radial order.

5. The optical fiber apparatus of claim 1 wherein said first HOM of said inner core is of a lower order than said second HOM of said inner core.

6. The optical fiber apparatus of claim 1 wherein said first material comprises a constituent that is substantially the same as a constituent of said second material.

7. The optical fiber of apparatus of claim I wherein at least one of said first and second materials comprises at least one of samarium, praseodymium or terbium.

8. The optical fiber apparatus of claim 1 wherein said optical fiber comprises a double clad fiber including a pump cladding for receiving pump optical energy.

9. The optical fiber apparatus of claim 1 wherein said optical fiber comprises an active material for providing optical energy having said wavelength of operation responsive to said optical fiber receiving pump optical energy, said active material comprising rare earth ions.

10. The optical fiber apparatus of claim 1 wherein said inner core, when considered in the absence of said first and second absorbing ring-shaped core regions, does not support any other HOMs at said wavelength of operation, such that said inner core is effectively single mode at said wavelength of operation.

11. The optical fiber apparatus of claim 1 wherein said inner core, when considered in the absence of said first and second absorbing ring-shaped core regions, does not support any other HOMs at a wavelength of about 1060 nanometers, such that said inner core is effectively single mode at a wavelength of about 1060 nanometers.

12. The optical fiber apparatus of claim 1 wherein said inner core, when considered in the absence of said first and second absorbing ring-shaped core regions, does not support any other HOMs at a wavelength of about 2000 nanometers, such that said inner core is effectively single mode at said wavelength of about 2000 nanometers.

13. The optical fiber apparatus of claim 1 wherein said first and second HOMs of said inner core are of the same azimuthal order.

14. The optical fiber apparatus of claim 1 wherein said inner core comprises an outer perimeter and does not comprise an inner perimeter.

15. An optical fiber having a fundamental mode having an increased effective area such that the optical fiber can propagate higher power before the onset of undesirable non linear effects, comprising:

a core structure comprising a central core and a plurality of concentric ring-shaped core regions spaced from each other and from said central core;

a region of cladding surrounding said central core and disposed between said central core and the nearest of said plurality of ring-shaped core regions;

said optical fiber having a wavelength of operation and said central core having a diameter of at least about 14 microns and, if considered as if surrounded only by the region of cladding, has at said wavelength of operation a V-number of at least 3 and supports a plurality of higher order modes ("central core HOMs"); and wherein said core structure is configured and arranged such that said central core is effectively single fundamental mode at said wavelength of operation without the need to bend the fiber to substantially increase the bend loss of said central core HOMs.

16. The optical fiber of claim 15 wherein said central core comprises a diameter of at least 20 microns.

17. The optical fiber of claim 15 wherein said central core comprises a diameter of at least 30 microns.

18. The optical fiber of claim 15 wherein central core comprises a numerical aperture, when considered in relation to said cladding region, of no greater than 0.10.

19. The optical fiber of claim 15 wherein each of said plurality of central core HOMs combines with a mode of a ring-shaped core region to form a HOM of said core structure wherein the value of the overlap integral of said core structure HOM with said central core and with a ring-shaped core region are of the same order of magnitude, at least two of said plurality of ring-shaped core regions have a mode so combining with a central core HOM; and wherein the value of the overlap integral of said single fundamental mode of said core structure with said central core is greater by at least an order of magnitude with the value of the overlap integral for said single fundamental mode with any of said plurality of ring-shaped core regions.

20. Optical apparatus, comprising an optical fiber having a wavelength of operation, said optical fiber comprising an inner core, said inner core supporting a fundamental mode and at least first and second higher order modes (HOMs) at said wavelength of operation;

a first ring-shaped core region spaced from and disposed about said inner core;

a second ring-shaped core region spaced from and disposed about said ring-shaped core region; and said optical fiber being configured and arranged such that said first HOM optically interacts with said first ring-shaped core region and said second HOM optically interacts with said second ring-shaped core region so that the optical apparatus emits radiation in substantially the fundamental mode.

* * * * *